US008301689B2

(12) United States Patent
Dion

(10) Patent No.: US 8,301,689 B2
(45) Date of Patent: Oct. 30, 2012

(54) CONTROLLING PRESENTATION ENGINE ON REMOTE DEVICE

(75) Inventor: Luc Dion, Montreal (CA)

(73) Assignee: Bluestreak Technology, Inc., Montreal (CA)

( * ) Notice: Subject to any disclaimer, the term of this patent is extended or adjusted under 35 U.S.C. 154(b) by 165 days.

(21) Appl. No.: 12/206,166

(22) Filed: Sep. 8, 2008

(65) Prior Publication Data
US 2009/0070440 A1    Mar. 12, 2009

Related U.S. Application Data

(60) Provisional application No. 60/970,438, filed on Sep. 6, 2007.

(51) Int. Cl.
G06F 15/16    (2006.01)
(52) U.S. Cl. ......... 709/203; 709/217; 709/223; 709/224
(58) Field of Classification Search .................. 709/203, 709/217, 219, 223, 224
See application file for complete search history.

(56) References Cited

U.S. PATENT DOCUMENTS

| 6,985,934 | B1* | 1/2006 | Armstrong et al. | 709/219 |
|---|---|---|---|---|
| 7,813,910 | B1* | 10/2010 | Poulin | 703/22 |
| 2002/0032754 | A1* | 3/2002 | Logston et al. | 709/219 |
| 2003/0236836 | A1* | 12/2003 | Borthwick | 709/204 |
| 2004/0110490 | A1* | 6/2004 | Steele et al. | 455/412.1 |
| 2004/0133855 | A1* | 7/2004 | Blair et al. | 715/517 |
| 2006/0112167 | A1* | 5/2006 | Steele et al. | 709/206 |
| 2006/0129999 | A1 | 6/2006 | Hiraoka et al. | |
| 2006/0218533 | A1 | 9/2006 | Koduru et al. | |
| 2007/0113218 | A1* | 5/2007 | Nolan et al. | 717/124 |
| 2007/0174490 | A1* | 7/2007 | Choi et al. | 709/246 |
| 2007/0204314 | A1* | 8/2007 | Hasek et al. | 725/100 |
| 2007/0225961 | A1 | 9/2007 | Ritts et al. | |
| 2010/0205148 | A1* | 8/2010 | Leblanc et al. | 707/628 |

OTHER PUBLICATIONS

Open Watcom Debugger User's Guide, First Edition, copyright 2002-2006, Open Watcom Contributors; portions copyright 1984-2002 Sybase, Inc. and its subsidiaries, (259 pages).
Non-Final Office Action for U.S. Appl. No. 12/206,185, mailed Jul. 18, 2011 (28 pages).
Response to Non-final Office Action for U.S. Appl. No. 12/206,185, mailed Jul. 18, 2011 (11 pages).
Final Office Action for U.S. Appl. No. 12/206,185, mailed Feb. 29, 2012 (18 pages).

* cited by examiner

Primary Examiner — LaShonda Jacobs
(74) Attorney, Agent, or Firm — Hubbard Law PLLC

(57) ABSTRACT

A communication mechanism or facility for enabling interaction with, and control of, a remote presentation engine for presenting a rich media application, such as one written using animated graphics allows the presentation engine to be configured or instructed remotely to perform certain actions, to send requests, and/or to send information, independently of the animated graphics application being executed. The communication facility between a workstation enables a presentation engine to pass a request by the application for resource stored on a workstation—an image file or a data file, for example—thereby creating a virtual file system. Local resource references can thus be maintained in the application during development without having to download all resources to the device in connection with testing.

30 Claims, 2 Drawing Sheets

CONTROLLING PRESENTATION ENGINE ON REMOTE DEVICE

CROSS REFERENCE TO RELATED APPLICATION

This application claims the benefit of provisional application Ser. No. 60/970,438, filed Sep. 6, 2007, the disclosure of which is incorporated herein by reference.

TECHNICAL FIELD OF THE INVENTION

The present invention relates generally to interaction with an animated graphics presentation engine on a remote, a resource-limited device.

BACKGROUND OF THE INVENTION

"Embedded systems" are, generally speaking, special purpose computer systems designed to perform certain dedicated functions that have been embedded into a device. Examples include mobile telephones and other hand-held or mobile devices, and set top boxes for cable and satellite television. Microprocessors or other logic circuits embedded in these devices or equipment are programmed to perform specific functions for the device. Economic considerations dictate that embedded systems have limited processing capability and memory and, at least in the case of mobile devices, smaller screens. Typically, it is just enough to perform their intended functions. Resource-limited devices, such as these, are generally not intended to be independently programmable by end users. They sometimes do not permit the user to load additional applications.

Computer applications are typically written using standard computational programming languages, such as C and C++. However, in order to more easily create sophisticated user interfaces and other applications providing rich media content and experiences, developers are turning to the use of graphics-oriented programming languages and platforms for developing rich media applications. These platforms reduce the burden of programming media-intensive interfaces and rich media applications by taking advantage of development tools oriented toward graphics and rich media, and presentation engines that perform much of the graphics processing.

Examples of applications that can be written for set top boxes in a graphics language or platform include those that enable users to interact with advanced network services, such as video on demand (VOD) services, digital video recorder (DVR) services, and electronic program guides, as well as games and many other types of applications. Similarly, on a mobile network, a network operator may want to deploy rich media applications that can be downloaded as required to the mobile device for allowing easy interaction with services offered by a mobile network, such as, for example, mobile television, music, and podcasting, in addition to services that enable easy access to remote devices and internet-based content.

In an application written using animated graphics, a series of static displays are sequentially rendered to create the illusion of animation. Each of these displays will be referred to generally as a "frame." Examples of such development environments include the Adobe® Flash® development tools, which generate SWF files, and programs written using SVG, which is a language for describing two-dimensional graphics. These applications or files describe graphical elements, text and other elements that are to be rendered, typically using standard vector graphic techniques. They also specify, for each frame, the placement of elements on a "canvas" within the frame. Bit map images, video and audio can also be referenced and placed and displayed or played according to a time line. A "presentation engine" or "player," reads the descriptions of the frames and the graphical elements and renders the frames according to the specified time line, and executes scripts associated with each frame and interaction with a user or the device on which the file is being executed.

For example, the Flash® development environment, which is widely used for creating web-based applications, generates a SWF file that encodes descriptions of the graphical elements, a description of each frame in terms of placement of graphical elements on the canvas for the frame, and any scripts that are to executed in connection with rendering of the frame or the user's interaction with it. The frames are rendered a specified frame rate. Similarly, SVG specifies document containing one or more "pages" for display. Each page contains an ordered grouping of graphical elements. Only one grouping is displayed at a time. Animation is created by using Synchronized Multimedia Integration Language (SMIL) to specify timing for rendering each page. Scripts are used to provide interaction with the elements and navigation between the pages.

A rich media application written using an animated graphics format or language does not need to be concerned with the details of rendering the graphics and coordinating video and audio, simplifying development and reducing the size of the applications. Scripts can be kept relatively simple by taking advantage of application programming interfaces (APIs) that are implemented by the presentation engines. The APIs typically provide a suite of standard functions, as well as functions useful for providing interactivity with the animated graphics and to controlling or interacting with the devices. Developers of applications are thus able to concentrate on the details of the applications, while developers of the presentation engine focus on enhancing playback performance of the presentation engine for particular devices and extending its functionality.

In addition to shortened development and deployment cycles, a further benefit of using animated graphics languages and authoring tools to generate rich media applications is that it allows dividing the task of writing the applications between graphics designers, who use authoring tools to create the graphical portions of the programs, and programmers who write scripts to add functionality and interactively.

One example of a presentation engine for executing a rich media application written using animated graphics on a resource limited device is the MachBlue™ presentation engine distributed by Bluestreak Networks, Inc. of Montreal, Canada. Other examples are the Flash® and Flash Lite® players of Adobe Systems, Inc. The MachBlue™ presentation engine is designed to run as middleware on embedded systems with limited processing power and memory, such as set top boxes for cable and satellite television and similar devices. The MachBlue™ presentation engine interprets and renders files encoded in SWF file format (though it does not support rendering all features of Flash® authoring environment) as well as certain extensions to the SWF file format adapted for specific devices.

SUMMARY

Typically, a presentation engine on a resource limited device simply executes an animated graphics application when it is loaded, performing processes according to the rich media application. The invention in a preferred embodiment relates to communication mechanisms or facilities for enabling interaction with, and control of, a remote presentation engine for presenting a rich media application, such as one written using animated graphics. In the example described below, the communications mechanism allows a presentation engine to be configured or instructed remotely to perform certain actions, to send requests, and/or to send information, independently of the animated graphics application being executed.

Such a communication mechanism or facility can provide several advantages and benefits. It can be utilized to configure and control the manner in which a remote presentation engine executes a rich media application on a resource-limited application. Controlling the execution would be useful in connection with, for example, debugging or profiling the application. When developing applications that will run a general purpose computer, a developer need only save the file in the necessary format and execute it. However, when developing an animated graphics application for an embedded system on a resource-limited device, the developer will typically load the application on the device and observe its behavior as it is being run. With a communications facility, instructions can be selectively sent to a presentation engine to configure the presentation engine to, for example, collect and send to a workstation traces embedded in an animated graphics application and to measure and return performance metrics on the execution of the application.

According to a different aspect of a preferred embodiment of the invention, a communication facility between a workstation enables a presentation engine to pass a request by the application for resource stored on a workstation—an image file or a data file, for example—thereby creating a virtual file system. Local resource references can thus be maintained in the application during development without having to download all resources to the device in connection with testing.

DETAILED DESCRIPTION

In the following description, like numbers refer to like elements.

Figure 1:
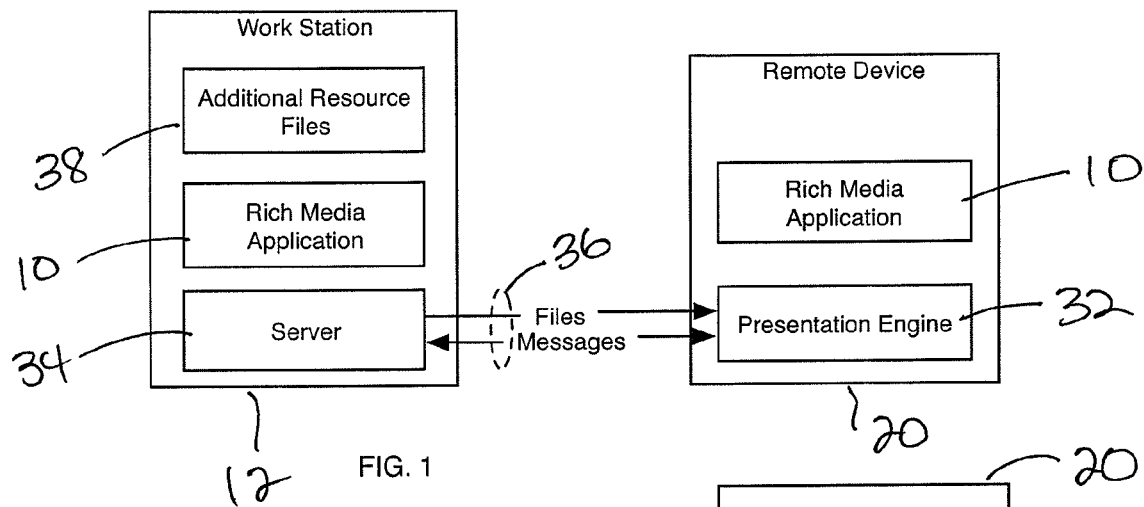
FIG. 1 is a schematic diagram representing certain computer processes and files on a workstation and a remote, resource-limited device.
Figure 2:
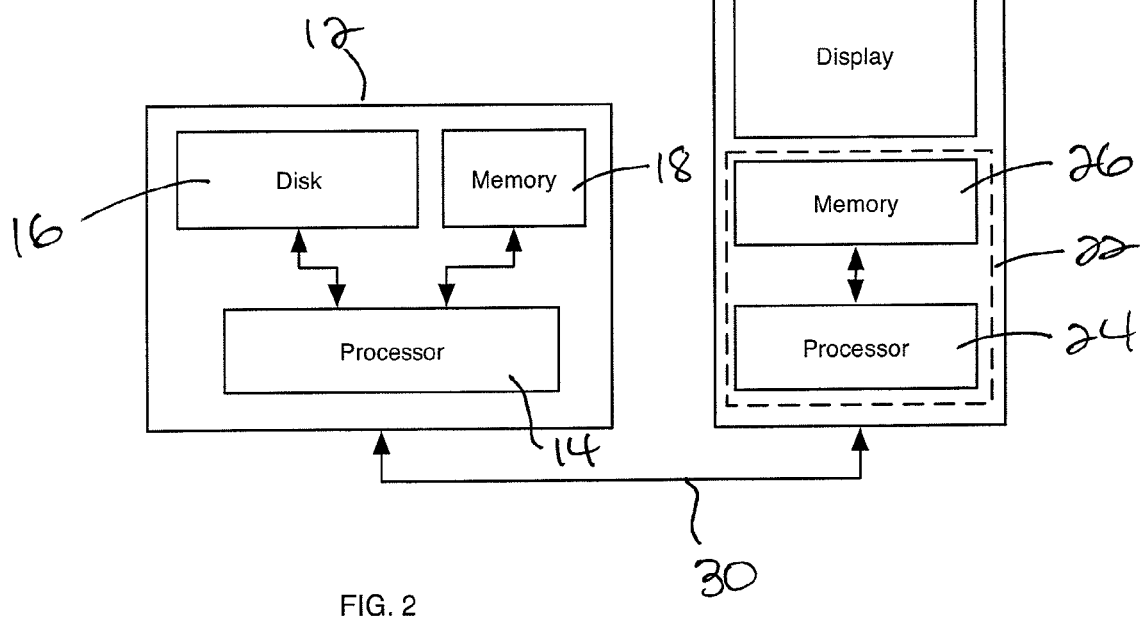
FIG. 2 is a schematic diagram representing hardware components of the workstation and the remote, resource-limited device of FIG. 1.

FIG. 1 schematically represents software-implemented processes and files on a workstation 12 and resource-limited remote device 20. FIG. 2 schematically represents the hardware for storing and executing software program instructions for performing the processes.

Animated graphics application 10 is stored on a general purpose computer workstation 12. The workstation could have been used to author, in whole or in part, the application, and thus may include program authoring tools that are stored and executed on the workstation. The workstation includes a processor 14, memory 16 for temporary storage of executing programs and data, and one or more disks 18 for storage of program and data files. The workstation is coupled to a remote device 20, such as a set top box or mobile, hand-held device with wireless communication capabilities, for example a cellular telephone or device with "Wi Fi" capabilities. The device includes a resource-limited or constrained embedded system 22 comprised of a central processing unit 24 for executing program instructions and files stored in memory 26. The device will also have additional elements relating to the particular purpose of the device. For example, if the device is a satellite or cable set top box, it would also include a tuner and interfaces for video and audio. In the illustrated example, the device includes a display 28, such as would be typically found on a mobile telephone. Memories 18 and 26 are intended to represent memory, in general, and are not intended to represent any particular memory structure. For example, memory in an embedded system will depend on the purpose of the system, but it typically will include some type of memory for long term storage (typically non-volatile) and working memory for use by the processor in storing program code and data.

The workstation 12 and remote device 20 are coupled through a physical communications channel 30. This communications channel is comprised of one or more links. Each link could be comprised of, for example, a wired or wireless connection. Examples of wired connections include serial, USB, and Ethernet connections. Examples of wireless connections include Bluetooth, wireless local or metropolitan area network connections (IEEE 802.11 or 802.16, for example), and cellular telephone and data.

A presentation engine 32 for executing or playing animated graphics files on a resource-constrained remote device is loaded on remote device 20. Communication server processes 34 executing on workstation 12 establish an application-level communication session 36 with presentation engine 32 over the physical communications channel 30. The server processes are further comprised of processes for enabling exchanging information with the presentation engine, including requests that control operation of presentation engine, such as by configuring its execution, and exchanging of files. The server processes pass information to and from other applications that are running on the workstation, which want to communicate with the presentation engine. For example, authoring applications or other development tools such as debugging tools can utilize the communications facility. These applications could be implemented to include the server processes, in whole or in part, or by utilizing plug-ins that provide these services. Alternately, these processes can be implemented as an independent application. The presentation engine either includes, or is configured to utilize, software for establishing the communication session and exchange communications with the server.

Resource limited devices come in many different varieties and have different capabilities for connecting to computers and networks. For example, some set top boxes support Ethernet connections and many mobile telephones do not. Mobile telephones may, on the other hand, support Bluetooth wireless connections. The processes on the workstation and the remote device for establishing and using the communication session are preferably implemented at the application level so that the communications session is independent of the nature of the medium over which communication with the presentation engine is taking place. This allows the sure communications protocol to be used over any type of communications medium independent of the processes used to establish and send information over the medium. However, the software program implementing the server processes, such as, for example, an authoring tool or debugging tool, preferably includes mechanisms or processes for configuring different types of communications mediums between a workstation and the resource limited device, over which the communications with the presentation engine may take place.

Figure 3:
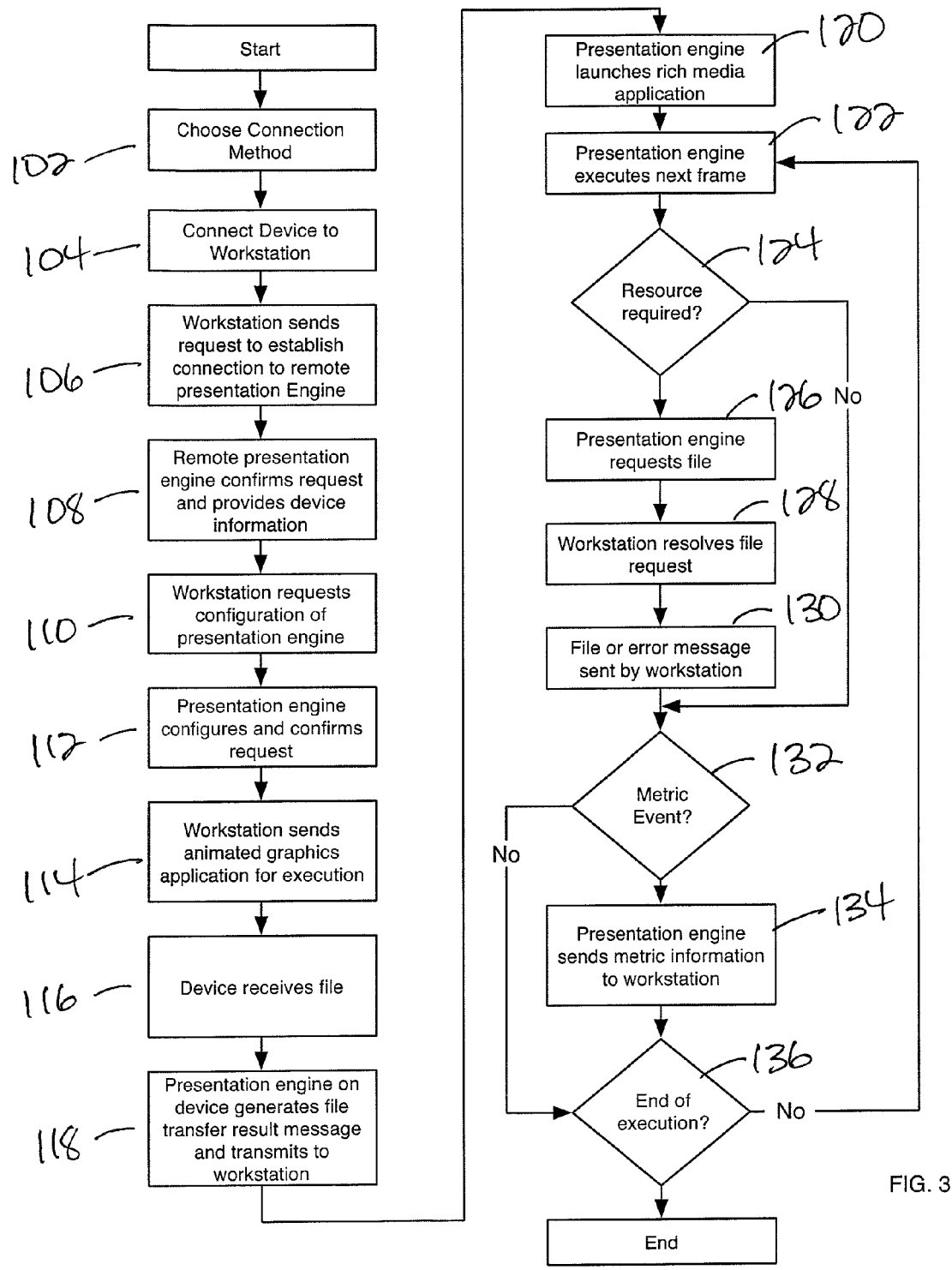
FIG. 3 is a flow diagram representing an example of a basic process of communicating between a server operating on a workstation and a presentation engine on a remote, resource-limited device.

A representative example of a process flow 100 utilizing the communication between the presentation engine 32 and the server 34 is illustrated by the flow chart of FIG. 3.

Referring now also to FIG. 3, in addition to FIGS. 1 and 2, the representative process starts with selection of a communications method at step 102. The server processes 34 preferably assist with configuring or setting up the communication medium with the remote device, depending on the type of device. For example, if it is TCP/IP connection using Ethernet interfaces at the workstation and the remote device, the application implementing the server processes can be used to enter and store IP addresses for configuring the connection. If the remote device is a cellular telephone, for example, the connection may use a Bluetooth wireless connection. The server processes could store profiles for different remote devices. Another example that can be used for Windows CE based devices is ActiveSync USB connection. Once the connection method is chosen and any configuration information not previously stored is entered, the server software initiates setting up the physical connection to the remote device at step 104 over the physical communications channel 30. The connection depends on the software and hardware installed on workstation and remote device, to which the server software has access. Alternately, the connection may be set up manually.

At step 106, the server software sends over the established communication link a request for connection to the presentation engine 32 on the remote device. The remote presentation engine 32 confirms the request by sending back certain information that identifies the device and details of the presentation engine at step 108. This establishes a communication session between the presentation engine and the server. The remaining steps in the flow chart are illustrative only, and can be performed out of order, depending on the purpose to which the communication facility is put.

For example, the workstation at step 110 transmits a request to the presentation engine to configure itself. This is a form of controlling the presentation engine. In the example of using the communication facility to control the presentation engine for collecting debugging information and performance metrics for profiling, the request could include a list of metrics to collect. The presentation engine would then turn on these services prior to executing a rich media application. The presentation engine configures itself at step 112 and confirms the request to the server.

The workstation sends at step 114 a rich media application file to the device for execution, and at step 116 the remote device 20 receives the file. The presentation engine 32 acknowledges that the file has been successfully transferred by sending a message to the server 34 at step 118.

The presentation engine then, as indicated by step 120, launches execution of the rich media application. In this example, the application is written as a frame-based animated graphics movie comprised of a sequences of frames. The next frame, or the first frame if there was no previous frame, is executed by the presentation engine at step 122.

When executing the application, the presentation engine may determine that it needs a resource referenced in the file, for example, a bitmap image such as a JPEG file or a XML file containing data, that is not stored on the remote device but rather on the remote host. The application might only specify the name of a file, and not a URL identifying the location of the file on the host or an otherwise fully qualified path to a directory on a host where the file can be found. The presentation engine is preferably enabled to send to the workstation, at step 126, a request for a resource file 38 on the workstation that it does not have and that is required for rendering of the frame or executing a script associated with the frame. When the request is received by the workstation server, the server assumes at step 128 that the file is located in the same directory as the rich media application 10 and transfers this file to the remote device at step 130 if it is found. If the file is not found, an error message is sent. This capability allows local resource references to be maintained in the application during development without having to download all resources to the device in connection with testing or include in the application a URL to the file on the workstation host.

The presentation engine could be configured to provide information in connection with execution. In the example of the communication facility being used in connection with a debugging or profiling tool, this might be execution metrics or statistics. At step 132, if the presentation engine has been configured to generate information or send a message when a predefined execution event has occurred, it will send to the server on the workstation at step 134 the message or information. Steps 122 to 134 are repeated until the application ends or is stopped, as represented by decision step 136.

The following is an illustrative example of a transfer protocol for implementing a preferred embodiment of communications facility for purposes of assisting with debugging and profiling of an animated graphics application being executed by a presentation engine on a remote device, and is not intended to limit the general concepts expressed above.

Data sent between a workstation and a remote device is, in this example, packaged in a packet. In this example, a packet corresponds to either a "message" (no results are returned) or a request (a result is returned). (The term "message" used elsewhere in this description is not limited to this particular meaning and, instead, is intended to mean any transfer of information.) This is controlled by a flag in all packets that indicates if a result must be returned by the receiver. A packet contains two parts: a packet header and packet data or payload. The packet header includes information on the size of the data part of the packet, a validation field and a CRC field for checking data integrity. The payload depends on the type of packet. The packet data comprises what will be termed generically below as a "request," even though the request may actually constitute a message if no result is expected.

A request header includes one or more of the following types of information: an identifier of the type of packet, for example a trace, a file transfer, or a device information request; the size of the request; a unique request identifier; an application identifier that identifies a running animated graphics application file; and flags that affect the handling of a request. For example, a flag can be set to indicate that a result must be returned by the request receiver to indicate the request completion result.

Following are examples of request types for implementing this example.

An "Establish Connection" request is sent by the newly connected client to notify the server on the workstation that it is now waiting for requests. The servers send the request. The remote client should respond by sending a Device Information request.

A "Device Info" request is sent by the client on the remote device to give information on the presentation engine and device to the newly connected client. This request is sent immediately after an Establish connection request is received. The request preferably includes, for example, the protocol version, which indicates the device supported version of the communication protocol, the device platform type, which identifies the hardware/software platform on which the presentation engine is running, and the version of the presentation engine.

A "Result" request sends the result of a received request. It preferably contains a unique identifier of the received request and the requested result.

A "File Transfer" request is used to send a file to the remote client. It preferably includes the name of the file, its size, and the actual file content, and a flag to indicate whether the file must be executed or launched by the presentation engine.

Additional requests can be structured to configure the presentation engine and to request and receive additional information from the presentation engine, which in this example is information about the execution of the animated graphics application by the presentation engine.

A "Trace" request is used by the presentation engine client to send a SWF trace. It includes an indication of the type of encoding used for the data string, for example ANSI, UCS2, UCS4, etc., the size of the data string, and the actual data string containing the trace information.

A "Frame Info" request is used to transmit metrics about the execution of a frame of the animated graphics application. The metrics is packaged as a list of value-pairs. Each value-pair includes an identifier of the metric, for example the time it took to render the frame, the amount of memory used, the time it took to execute scripts associated with the frame, etc., and a data value.

To configure the remote presentation engine, the server on the workstation sends a Configuration request. In the debugging/profiling example, the Configuration request specifies in its data part a list of metrics to calculate and return after execution of each frame of the animated graphics application is completed. This request is preferably sent immediately after the connection is established with a remote device.

The foregoing description is of exemplary and preferred embodiments of a communications facility for controlling a presentation engine executing an animated graphics program on a remote, resource-limited device, employing at least in part certain teachings of the invention. The invention is not limited to the described examples or embodiments. Alterations and modifications to the disclosed embodiments may be made without departing from the invention. The meaning of the terms used in this specification are, unless expressly stated otherwise, intended to have ordinary and customary meaning and are not intended to be limited to the details of the illustrated structures or the disclosed embodiments. None of the foregoing description is to be read as implying that any particular element, step, or function is an essential element which must be included in the claim scope. The scope of patented subject matter is defined only by the issued claims. None of these claims are intended to invoke paragraph six of 35 USC §112 unless the exact words "means for" or "steps for" are followed by a participle.

What is claimed is:

1. A computer implemented method for controlling execution of a rich media application by a presentation engine running on a remote device comprised of an embedded computing system, the embedded computing system comprising a microprocessor and memory, the method comprising:
    establishing a communication session between the computer and the remote device;
    configuring over the communication session, with a server executing on the computer, the presentation engine that is running on the remote device to collect one or more performance metrics or debugging information when the presentation engine is rendering the rich media application; and
    transferring the rich media application from the computer to the remote device for execution by the remote device, the presentation engine executing the rich media application by, in part, rendering a series of frames for display on the remote device, the rich media application being written using an animated graphics language.

2. The computer implemented method of claim 1, further comprising receiving from the remote device performance metrics collected by the presentation engine.

3. The computer implemented method of claim 1, further comprising:
    receiving by the computer a request from the presentation engine for a resource file not stored on the remote device; and
    transmitting the requested resource file to the remote device.

4. The computer implemented method of claim 3 wherein the request for the resource file does not include a fully qualified path to a location where the requested resource file is stored, and wherein the method further comprises resolving the request in order to locate and transmit the requested resource file.

5. The computer implemented method of claim 1, wherein the server is comprised of a development tool running on the computer.

6. The computer implemented method of claim 1, further comprising configuring a communication channel between the computer and the remote device.

7. The computer implemented method of claim 1, wherein the remote device is chosen from a group consisting of from a group consisting of a mobile wireless communication device, a mobile telephone, a satellite set top box, or a cable set top box.

8. The method of claim 1, wherein the presentation engine determines after rendering of each frame whether to collect the one or more performance metrics or debugging information and, if to be collected, collects the one or more performance metrics or debugging information for transmission to the computer.

9. Computer readable medium, excluding signals, storing program instructions for execution by a computer, the program instructions comprising instructions for:
    establishing a communication session between the computer and a remote device, the remote device comprising a microprocessor and memory for running a presentation engine, the presentation executing a rich media application, written using animated graphics, by, in part, rendering a series of frames for display on the remote device;
    configuring the presentation engine for collecting one or more of performance metrics and debugging information, with a server by transmitting one or more messages during the communications session; and
    transferring a rich media application from the computer to the remote device for execution by the presentation engine.

10. The computer readable medium of claim 9, the program instructions further comprising instructions for receiving from the presentation engine performance metrics collected by the presentation engine.

11. The computer readable medium of claim 9, further comprising instructions for:
    receiving by the computer a request from the presentation engine for a resource file not stored on the remote device; and
    transmitting the requested resource file to the remote device.

12. The computer readable medium of claim 11, wherein the request for the resource file does not include a fully qualified path to a location where the requested resource file is stored, and further comprising instructions for resolving the request in order to locate and transmit the requested resource file.

13. The computer readable medium of claim 9, wherein the server is comprised of a development tool running on the computer.

14. The computer readable medium of claim 9, further comprising instructions for configuring a communication channel between the computer and the remote device.

15. The computer readable medium of claim 9, wherein the remote device is chosen from a group consisting of a mobile wireless communication device, a mobile telephone, a satellite set top box, or a cable set top box.

16. The computer readable memory of claim 9, wherein the presentation engine determines after rendering of each frame whether to collect the one or more performance metrics or debugging information and, if to be collected, collects the one or more performance metrics or debugging information for transmission to the computer.

17. Computer readable medium storing program instructions for execution by a processor embedded in a device, the program instructions comprising instructions for:
  establishing a communication session of a communication channel between a remote computer and the device;
  configuring, over the communication session, execution of a rich media application, written using an animated graphics language, by a presentation engine, the presentation executing the rich media application by, in part, rendering a series of frames for display on the embedded device, to collect one or more of predefined performance metrics and debugging information in response to receiving a message from the remote computer specifying a configuration; and
  executing the rich media application, executing comprising rendering graphical frames described by the rich media application.

18. The computer readable medium of claim 17, wherein the program instructions further comprise instructions for receiving the rich media application file through the communication session and automatically executing it.

19. The computer readable medium of claim 17, the program instructions further comprising instructions for sending a message to the remote computer requesting a resource file that is not stored on the device and that is specified by the rich media application by path that is not fully qualified.

20. The computer readable medium of claim 17, wherein the remote device is chosen from a group consisting of a mobile wireless communication device, a mobile telephone, a satellite set top box, or a cable set top box.

21. The computer readable memory of claim 17, wherein the presentation engine determines after rendering of each frame whether to collect the one or more performance metrics or debugging information and, if to be collected, collects the one or more performance metrics or debugging information for transmission to the computer.

22. A computer implemented method for controlling execution of a rich media application by a presentation engine running on a remote device comprised of an embedded computing system, the embedded computing system comprising a microprocessor and memory, the presentation engine executing the rich media application by, in part, rendering a series of frames, the method comprising:
  establishing a communication session between the computer and the remote device;
  transferring the rich media application from the computer to the remote device, the rich media application written in an animated graphics language describing to the presentation engine the series of frames to rendered using at least one resource, the rich media application including a local reference to a resource file containing the at least one resource that is not transferred to the remote device with the rich media application;
  receiving over the communication session by the computer a request from the presentation engine for the resource file not stored on the remote device for use in playback of the rich media application by the presentation engine; and
  transmitting the requested resource file to the remote device;
  wherein the request for the resource file does not include a fully qualified path to a location where the requested resource file is stored, and wherein the method further comprises resolving the request in order to locate and transmit the requested resource file.

23. The computer implemented method of claim 22, wherein the remote device is chosen from a group consisting of a mobile wireless communication device, a mobile telephone, a satellite set top box, or a cable set top box.

24. Computer readable medium storing program instructions for execution by a computer, the program instructions comprising instructions for:
  establishing a communication session between the computer and a remote device, the remote device comprising a microprocessor and memory for running a presentation engine, the presentation engine executing a rich media application by, in part, rendering a series of frames described by the rich media application, the rich media application referencing at least one resource for display in connection with rendering at least one of the frames;
  receiving by the computer a request from the presentation engine for a resource file for the at least one resource for use in playback of a the rich media application by the presentation engine not stored on the remote device, the rich media application including a local reference to a resource file that is not transferred to the remote device with the rich media application; and
  transmitting the requested resource file to the remote device;
  wherein the request for the resource file does not include a fully qualified path to a location where the requested resource file is stored, and wherein the instructions further comprise instructions for resolving the request in order to locate and transmit the requested resource file.

25. The computer readable medium of claim 24, further comprising instructions for configuring a communication channel between the computer and the remote device.

26. The computer readable medium of claim 24, wherein the remote device is chosen from a group consisting of a mobile wireless communication device, a mobile telephone, a satellite set top box, or a cable set top box.

27. Computer readable medium storing program instructions for execution by a processor embedded in a device, the program instructions comprising instructions for:
  establishing a communication session of a communication channel between a remote computer and the device;
  receiving a rich media application to be executed having local reference to a resource file that is not transferred to the device with the rich media application, the rich media application being written using an animated graphics language;

executing the rich media application, executing comprising rendering graphical frames described by the rich media application using a presentation engine, the presentation engine executing a rich media application by, in part, rendering a series of frames described by the rich media application, the rich media application referencing at least one resource for display in connection with rendering at least one of the frames;

sending a message to the remote computer requesting a the resource file that is not stored on the device when needed for execution by the presentation engine of the rich media application, the resource file being specified by a local reference having a path that is not fully qualified on the remote computer.

28. The computer readable medium of claim 27, where the instructions further include instructions for receiving the requested file.

29. The computer readable medium of claim 27, wherein the instructions further comprise instructions for configuring execution of the rich media application in response to receiving a message from the remote computer specifying a configuration; wherein configuring comprises setting up collection of performance metrics measured during execution of the rich media application.

30. The computer readable medium of claim 27, wherein the remote device is chosen from a group consisting of a mobile wireless communication device, a mobile telephone, a satellite set top box, or a cable set top box.

* * * * *